Figure 1:
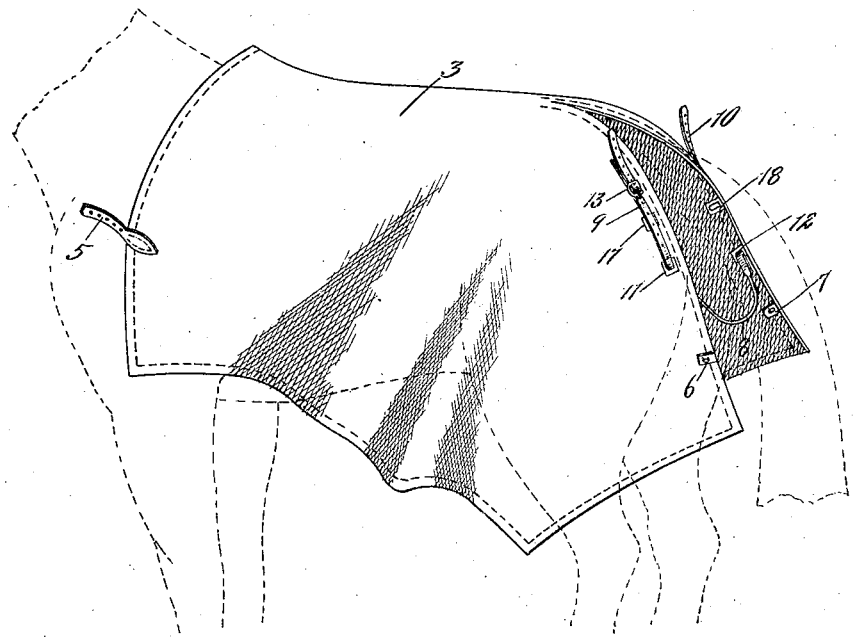

No. 876,435.   PATENTED JAN. 14, 1908.
E. CALDWELL.
HORSE BLANKET.
APPLICATION FILED JAN. 26, 1907.

Witnesses:
Ira D. Perry
William H. DeBush

Inventor:
Edwin Caldwell,
by Bond Adams Pickard Jackson
his Atty's

UNITED STATES PATENT OFFICE.

EDWIN CALDWELL, OF BURLINGTON, WISCONSIN.

HORSE-BLANKET.

No. 876,435.  Specification of Letters Patent.  Patented Jan. 14, 1908.

Application filed January 26, 1907. Serial No. 354,269.

*To all whom it may concern:*

Be it known that I, EDWIN CALDWELL, a citizen of the United States, residing at Burlington, Racine county, State of Wisconsin, have invented certain new and useful Improvements in Horse-Blankets, of which the following is a specification, reference being had to the accompanying drawings.

My invention relates to horse blankets, and has particularly for its objects to provide a new and improved construction of blanket which may readily be fitted to horses of different sizes or proportions, and which, when fitted in place, will be held securely so that it will not become displaced when the animal lies down or moves in its stall; and furthermore, which is so fashioned that it will not readily be soiled by the animal when dropping manure. I accomplish these objects as illustrated in the drawings and as hereinafter described.

What I regard as new is set forth in the claims.

Figure 2:
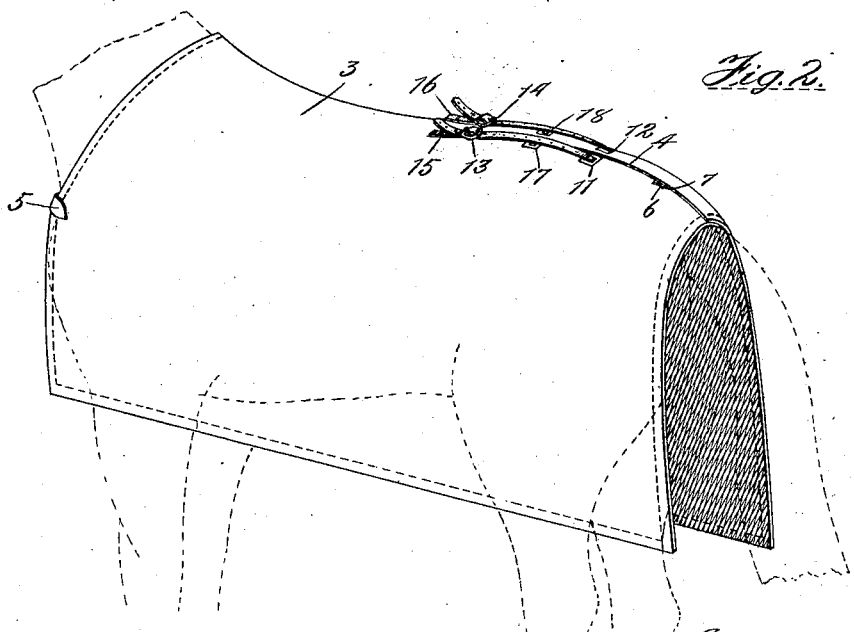

In the accompanying drawings, the figures are perspective views illustrating a blanket, Figure 1 showing the position of the blanket when first thrown on the horse, and Fig. 2 showing the blanket when fitted to and secured upon the horse.

Referring to the drawings, 3 indicates the blanket, which is of the usual shape except that it is slit centrally for about one-fourth of its length, the slit extending from the rear of the blanket forward along its median line, as shown at 4 in the drawings.

5 indicates a strap or other suitable fastener provided at the front end of the blanket for securing the front end of the blanket in the usual way, said strap being arranged to extend across the breast of the horse.

6—7 indicate the members of a fastening, preferably of the usual ball and socket or glove fastener type, secured to the opposite sides of the slit portion of the blanket near the rear end thereof, as shown in the drawings. Said fastener is for the purpose of securing the slit portions together after the blanket has been adjusted to the horse and drawn up in place.

8 indicates a tail-strap, preferably of round leather, which is placed under the rear portion of the blanket, so that it may be fitted under the tail of the horse, as hereinafter described. Said tail-strap is provided at its ends with connecting straps 9—10, which pass through gromets 11—12 in the opposite margins of the blanket and are adapted to be secured to the blanket by buckles or other suitable fasteners 13—14, respectively, the buckles being carried by straps 15—16, as shown in Fig. 2. It will be noted that the gromets 11—12 are at a greater distance from the rear margin of the blanket than the fastening members 6—7 that connect the slit portions of the blanket, and that the buckles 13—14 are still further from the rear edge of the blanket, the object of this arrangement being to provide for drawing the tail-strap 8 forward and securing it in such position that it may be drawn up closely under the animal's tail, and the slit portions of the blanket may be drawn together and secured so as to cover the tail-strap and a portion of the animal's tail, as shown in Fig. 2. In order to provide for more extensive adjustment of the tail-strap without leaving too much of it below the blanket, I provide a plurality of pairs of gromets, 17—18 indicating a second pair, as shown in the drawings.

In applying the blanket to the horse, the fastening members 6—7 are disconnected so that the end portions of the rear end of the blanket may be separated. The blanket is then thrown upon the horse in a position to the rear of its proper position, as shown in Fig. 1. This permits the tail-strap 8 to hang down quite a distance below the root of the tail, so that the operator may readily seize the animal's tail and draw it over the tail-strap, and between the separated rear portions of the blanket. As soon as the tail has been properly adjusted relatively to the tail-strap, the operator stands in front of the animal and, seizing the sides of the front end of the blanket, draws it sharply forward, thus bringing the tail-strap closely up under the animal's tail. The strap, or other fastening 5, may then be secured, after which the members 6—7 of the rear fastening are also secured, and the blanket will be held properly in place without the use of a surcingle or bellyband. It is to be understood, of course, that the tail-strap 8 should be properly adjusted to the particular animal, so that when the blanket is in its proper position the tail-strap will fit closely under the tail at the root thereof, but the blanket may readily be adjusted to animals of different sizes or proportions, since, by adjusting straps 9—10, the tail-strap may be readily fitted to any animal of reasonable proportions. Also, the member 7 of the rear fastening may be provided with a plurality of sockets, for adjustment purposes.

If the blanket is to be applied to a much shorter animal, in order not to leave too much of the tail-strap below the blanket, the connecting straps 9—10 should be passed through the forward gromets, as the gromets through which the connecting straps are passed should in all cases be forward of the root of the animal's tail, so as to get a forward pull on the tail-strap. On account of thus drawing the tail-strap up closely under the animal's tail, as described, it cannot be fouled.

Instead of using the various forms of fasteners shown in the drawings, it will be understood that any other suitable fastenings may be employed. Also, I wish it to be understood that I have used the term "blanket" in a generic sense, and not as indicating the materials of which the device is made, as it may be made of any suitable materials. It may also be applied to various animals, although it is intended primarily for horses.

So far as I am aware, no one has heretofore provided a blanket slit longitudinally at the rear and having a tail-strap for the purpose stated. The claims hereinafter made are therefore to be construed accordingly.

What I claim as my invention and desire to secure by Letters Patent is:—

1. A blanket having a tail-strap on the under side thereof near its rear end, said blanket being slit longitudinally at the rear, the ends of the tail-strap being secured to the blanket at opposite sides of the slit.

2. A blanket having its rear end portion slit longitudinally, and a tail-strap having its ends secured to said blanket at opposite sides of said slit.

3. A blanket having a tail-strap on the under side thereof near its rear end, said blanket being slit longitudinally at the rear, the ends of the tail-strap being secured to the blanket at opposite sides of the slit, and means for fastening the slit portions of the blanket together.

4. A blanket having a tail-strap on the under side thereof, the rear portion of the blanket being slit longitudinally, the ends of said tail-strap being secured at opposite sides of the slit, and means for adjusting the length of the tail-strap.

EDWIN CALDWELL.

Witnesses:
JOHN L. JACKSON,
WILLIAM H. DE BUSK.